(12) United States Patent
Eriksson et al.

(10) Patent No.: US 9,687,914 B2
(45) Date of Patent: Jun. 27, 2017

(54) DRILLING TOOL WITH A FLEXIBLE SPINDLE FEEDING

(71) Applicant: ATLAS COPCO INDUSTRIAL TECHNIQUE AB, Stockholm (SE)

(72) Inventors: Ulf Mikael Eriksson, Vallentuna (SE); Lars Joakim Edberg, Enskede (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 81 days.

(21) Appl. No.: 14/435,029

(22) PCT Filed: Oct. 21, 2013

(86) PCT No.: PCT/EP2013/071962
§ 371 (c)(1),
(2) Date: Apr. 10, 2015

(87) PCT Pub. No.: WO2014/064047
PCT Pub. Date: May 1, 2014

(65) Prior Publication Data
US 2015/0273596 A1    Oct. 1, 2015

(30) Foreign Application Priority Data
Oct. 26, 2012  (SE) ...................... 1200662

(51) Int. Cl.
*B23B 47/34*    (2006.01)
*B23Q 5/32*    (2006.01)
*B23Q 5/40*    (2006.01)

(52) U.S. Cl.
CPC ............. *B23B 47/34* (2013.01); *B23Q 5/323* (2013.01); *B23Q 5/326* (2013.01); *B23Q 5/402* (2013.01);
(Continued)

(58) Field of Classification Search
CPC ...... Y10T 408/23; B23B 29/125; B23B 37/00; B23B 47/34; B23B 2228/36; B23Q 5/323; B23Q 16/003
(Continued)

(56) References Cited

U.S. PATENT DOCUMENTS 1,650,383 A * 11/1927 Osgood ................ E21B 19/081
173/156
2,770,974 A * 11/1956 Jacobs ...................... B06B 1/10
409/345
(Continued)

FOREIGN PATENT DOCUMENTS

| FR | 2952563 B1 | 2/2012 |
| JP | 03136710 A | 6/1991 |
| WO | 2013088343 A1 | 6/2013 |

OTHER PUBLICATIONS

International Search Report (ISR) and International Preliminary Report on Patentability (IPRP) dated Jan. 21, 2014 issued in International Application No. PCT/EP2013/071962.

*Primary Examiner* — Eric A Gates
*Assistant Examiner* — Donte Brown
(74) *Attorney, Agent, or Firm* — Holtz, Holtz & Volek PC (57) ABSTRACT

A drilling tool includes a spindle, a housing at least partly housing the spindle, a feed gear drivingly connected to a motor and threaded around the spindle to feed the spindle in an axial direction of the spindle by mutual rotation between the feed gear and spindle during a drilling process, and a micro peck unit which includes an undulated cam profile and a follower arranged to bear against the cam profile, and which produces an oscillating movement of the feed gear and the spindle upon rotation of the feed gear during a drilling process. The micro peck unit further includes interposable rolling elements arranged to be re-positioned into a gap between two circular contact surfaces in order to sepa- (Continued)

rate the cam profile from the follower, such that no oscillating movement is produced by the unit when the interposable rolling elements are positioned inside the gap between the contact surfaces.

9 Claims, 4 Drawing Sheets

(52) U.S. Cl.
CPC ....... *B23B 2228/36* (2013.01); *B23B 2260/02* (2013.01); *Y10T 408/03* (2015.01); *Y10T 408/23* (2015.01)

(58) Field of Classification Search
USPC .......................................................... 173/156
See application file for complete search history.

(56) References Cited

U.S. PATENT DOCUMENTS

| | | | |
|---|---|---|---|
| 3,003,372 A * | 10/1961 | Findley | B23B 47/34 408/17 |
| 3,363,700 A | 1/1968 | Bogusch | |
| 7,712,546 B2 * | 5/2010 | Tokunaga | B25B 21/00 173/146 |
| 2009/0074525 A1 | 3/2009 | Jaillon | |
| 2013/0051946 A1 | 2/2013 | Peigne | |
| 2014/0338944 A1 * | 11/2014 | Herr | B25D 17/00 173/94 |

* cited by examiner

DRILLING TOOL WITH A FLEXIBLE SPINDLE FEEDING

The invention relates to a micro peck unit for a drilling tool, and a drilling tool comprising such a micro peck unit. A micro peck unit is a drive mechanism that provides a non-uniform feeding of a drill spindle in a drilling tool. The invention also relates to a method of de-activating a micro peck unit in a drilling tool.

BACKGROUND

When drilling is performed through several layers of material of different hardness it sometimes happens that the waste material from a relatively hard material damages the surface of a relatively softer material.

These problems may be minimised and eliminated by the provision of a micro-pecking mechanism. Micro-pecking means that the drilling is performed in a non-uniform manner, such that the drill spindle is advanced in pulses instead of being continuously fed. When the drill spindle is advanced in pulses the waste material that is machined away from the drill hole will be in the form of chips instead of long strips. The chips are easily removed by the rotation of the drilling implement without harming the surface of the produced drill hole.

A drilling tool with a micro-pecking arrangement is known from the patent specification FR 2952563 B1. In this arrangement the spindle is spring loaded in a first direction. Further, it comprises a rolling bearing with rolling elements that roll along an undulating rolling surface so as to periodically stress the spindle to move in a second direction opposite the direction of the spring. This arrangement causes an axial vibratory movement that accompanies the rotation that advances the spindle.

In some implementations it is not desired to have a vibratory movement. For instance it is not desired to have a vibratory movement when a countersinking is being machined to a work piece. Instead, it is desired to have a uniform advancement of the spindle such that the surface of the countersinking will be as uniform, i.e. as even, as possible. A vibratory movement would cause the surface of the countersinking to be undulated. Often, a drilling operation is combined with the machining of a countersinking.

Hence, there is a need of a drilling tool which may produce a vibratory or non-uniform advancement of the spindle at times when that is desired, but which may also be used to perform drilling with a uniform or non-vibratory advancement of the spindle at other times.

SUMMARY OF THE INVENTION

An object of the invention is to provide a drilling tool which may selectively produce both a non-uniform advancement of the spindle, and a uniform advancement of the spindle.

This object is achieved by a first aspect of the invention, which relates to a micro peck unit for arrangement in a drilling tool, which drilling tool includes:
  a spindle,
  a housing that at least partly houses said spindle,
  a motor for driving said spindle, and
  a feed gear that is drivingly connected to the motor and threaded around the spindle so as to feed the spindle axially with respect to the housing by means of mutual rotation between the feed gear and the spindle in a drilling operation.

The micro peck unit comprises an undulated cam profile and a follower arranged to bear against said cam profile, which unit in operation is arranged as an axial support between the feed gear and the housing, whereof one of the cam profile and the follower is fixedly arranged with respect to the housing and the other is arranged to rotate along with the feed gear or by interaction with the feed gear, such that said unit will produce an oscillating movement of the feed gear and the spindle upon the rotation of the feed gear in a drilling operation, Further, the micro peck unit comprises a de-activation mechanism including a first and a second opposed circular contact surfaces and a set of interposable rolling elements, wherein the first circular contact surface is axially supported by the housing in operation, and the second circular contact surface is axially supported by the feed gear in operation, and wherein a gap exists between the opposed circular contact surfaces into which the set of interposable rolling elements are arranged to be at least partially re-positioned in order to separate the first circular contact surface and the second circular contact surface from each other, so as to simultaneously axially displace the feed gear with respect to the housing, such that the follower of the micro peck unit will not bear against the cam profile and such that no oscillating movement will be produced by the micro peck unit when the interposable rolling elements are positioned partially inside the gap between the two planar contact surface.

In a specific embodiment of the invention a trigger wedge is arranged to control the position of the interposable rolling elements, wherein the trigger wedge may be controlled to reposition the interposable rolling elements from an initial position, in which the feed gear is axially supported by the undulated cam profile and the follower, to an interfering position in which the feed gear is axially supported by the interposable rolling elements that bear against the circular contact surfaces.

In another embodiment of the invention the interposable rolling elements are balls that are arranged in radial tracks in a first thrust washer that is located axially between the two circular contact surfaces.

In yet another embodiment of the invention the micro peck unit the trigger wedge is cylindrical and located co-axially outside the spindle and includes a bevelled front edge that, when the trigger wedge is axially translated towards the interposable rolling elements is arranged to push the interposable rolling elements in a first radial direction along the radial tracks of the first thrust washer into the interfering position between the circular contact surfaces.

In a specific embodiment, the first circular contact surface is chamfered, so as to push the set of interposable rolling elements in a second radial direction, opposed to the first radial direction, out of the gap between the opposed circular contact surfaces when the trigger wedge is translated away from the interposable rolling elements.

In another embodiment of the invention the trigger wedge is, in operation, affected by a stop ring that is arranged on the spindle, the trigger wedge having a back end that is arranged as an abutment for the stop ring, such that the trigger wedge will be triggered as a function of the axial position of the spindle.

In yet another embodiment of the invention the follower includes a set of primary rolling elements arranged in the first thrust washer to bear against the undulated cam profile at one side, and against a surface connected to the feed gear at the opposite side.

In another embodiment of the invention the micro peck unit includes a second thrust washer that includes both the undulated cam profile and the first circular contact surface, and wherein the undulated cam profile and the first circular contact surface are radially spaced from each other on said second thrust washer.

In one embodiment of the invention the micro peck unit includes an end washer that includes the second circular contact surface, which end washer bears against the feed gear in operation.

In one specific embodiment the micro peck unit is a separate unit that includes a separate housing and an end washer and that may be fixedly arranged with respect to a housing of a drilling tool co-axially outside a spindle of said a drilling tool.

According to a second aspect the invention relates to a drilling tool comprising:
- a spindle,
- a housing that at least partly houses said spindle,
- a motor for driving said spindle,
- a feed gear that is drivingly connected to the motor and threaded around the spindle so as to feed the spindle in an axial direction of the spindle by means of mutual rotation between the feed gear and the spindle during a drilling operation. The drilling tool also comprises a micro peck unit as described above.

In a specific embodiment, the drilling tool includes tool implements both for drilling a hole and for producing a countersinking, and wherein a stop ring is located at a specific position along the spindle such that the interposable rolling elements are pushed into the interfering position when a countersinking is being produced.

According to a third aspect the invention relates to a method of de-activating an oscillating movement in a drilling tool, which method comprises the steps of:
- feeding a rotating spindle of a drilling tool in an axial direction thereof;
- providing an oscillating movement to the spindle by means of the interaction of an undulated cam profile and a follower, which rotate with respect to each other. The method further involves a step of interrupting the interaction of the undulated cam profile and the follower, such that the spindle may be rotated without providing an oscillating movement to the spindle.

In a specific embodiment of the method the step of interrupting the interaction of the undulated cam profile and the follower is triggered by the axial position of the spindle, such that the interaction is interrupted when the spindle reaches a specific axial position.

In another embodiment of the method the step of interrupting the interaction of the undulated cam profile and the follower involves the action of separating the undulated cam profile and the follower out of contact from each other.

Another way of interrupting the interaction of the undulated cam profile and the follower would be to lock them from mutual rotation and by allowing a mutual rotation at another point, where no oscillations are produced.

Other features and advantages of the invention will be apparent from the figures and from the detailed description of the shown embodiment.

SHORT DESCRIPTION OF THE DRAWINGS

In the following detailed description reference is made to the accompanying drawings, of which.

DETAILED DESCRIPTION OF THE SHOWN EMBODIMENT OF THE INVENTION

Figure 1:
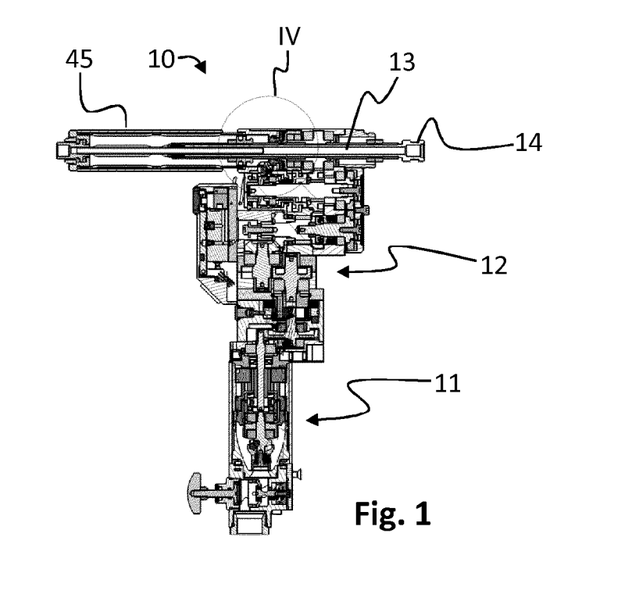
FIG. 1 shows a drilling tool according to a specific embodiment of the invention.

In FIG. 1 a drilling tool 10 is shown. The drilling tool includes a motor 11, and a gear box 12, via which a spindle 13 is driven. The spindle 13 includes a socket 14, to which a drill implement (not shown) may be attached. A cylindrical casing 45 is arranged to protect and cover the back end of the spindle 13. The shown drilling tool 10 is a pneumatic drilling tool. The invention may however also be implemented on an electric drilling tool.

Figure 9:
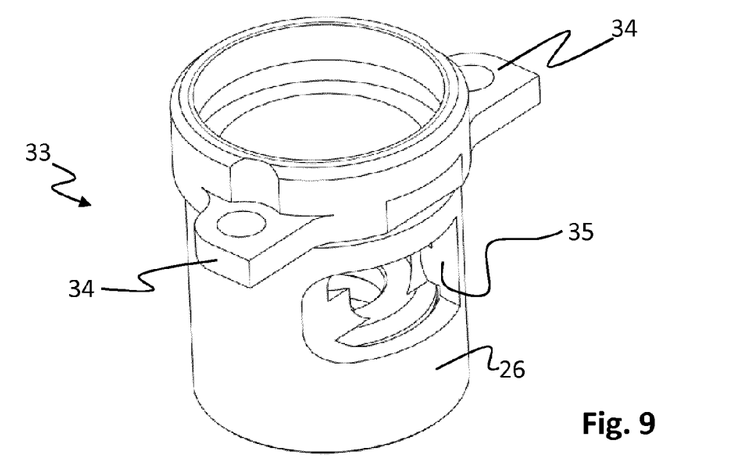
FIG. 9 shows a separate micro peck unit according to one embodiment of the invention.
Figure 10:
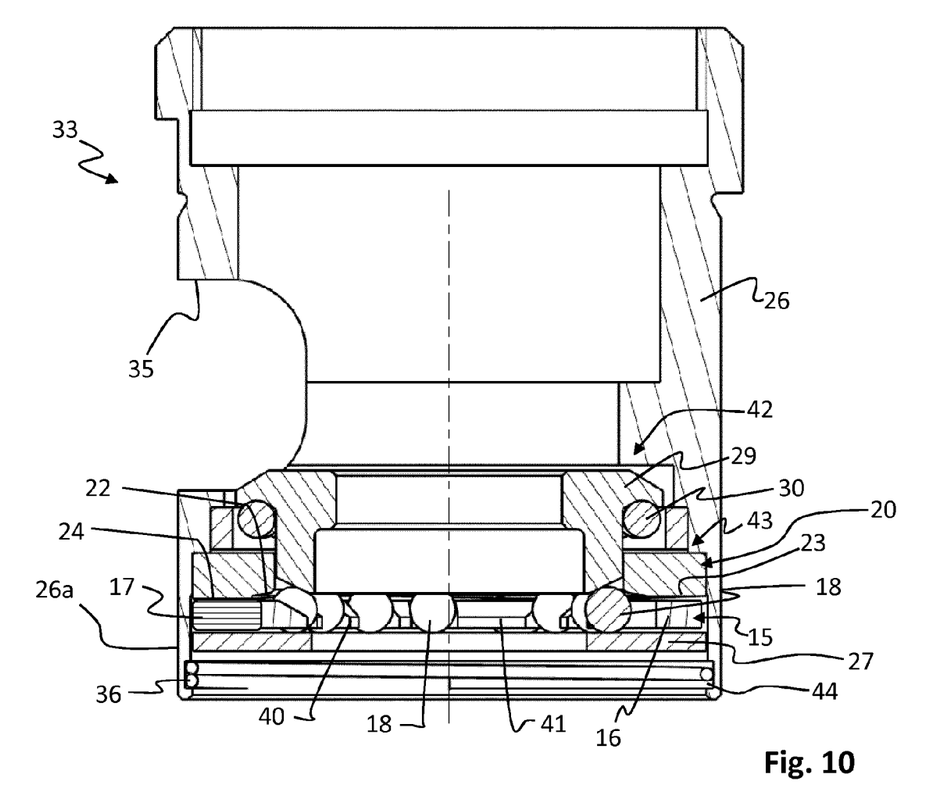
FIG. 10 shows a sectional view of the micro peck unit of FIG. 9.

The drilling tool 10 includes a micro peck unit for advancing the spindle in a non-uniform manner, i.e. by micro-pecking. A specific embodiment of the micro peck unit 33 is shown in FIGS. 9 and 10, which will be described further down in the description. The shown embodiment of the micro peck unit 33 includes a first thrust washer 15 and a second thrust washer 20, which are individually illustrated in FIGS. 2 and 3, respectively.

The non-uniform advancement is achieved by means of the interaction between these two thrust washers 15 and 20. The first thrust washer 15, shown in FIG. 2, includes a circular main body 16, and a follower 17. In the shown embodiment the follower 17 comprises three cylindrical wheels of a diameter that exceeds the thickness of the main body 16 of the first thrust washer 15.

Figure 2:
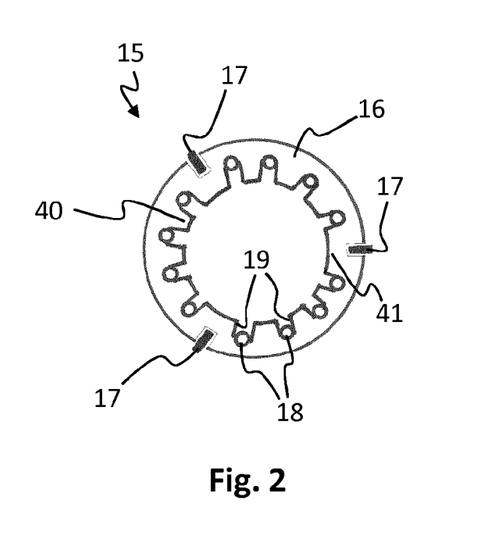
FIG. 2 shows a schematic illustration of a first thrust washer that is included in the shown embodiment of the invention.

Further, interposable rolling elements 18, are arranged in the first thrust washer 15. In the shown embodiment these interposable rolling elements 18 are in the form of a number of balls that are arranged in radial tracks 19 arranged along the inner diameter main body 16. The tracks 19 are formed between solid parts 40 and 41. The thicker solid parts 41 separate the interposable rolling elements 18 into groups of four and the thinner solid parts 40 separate rolling elements 18 within a group from each other. The followers 17 are arranged within the thicker solid parts 41 of the first thrust washer 15.

The diameter of the followers 17 exceeds the thickness of the main body 16 of the first thrust washer 15, and the diameter of the ball-shaped interposable rolling elements 18 exceeds the diameter of the followers 17. These relationships are important in order for the present embodiment of the invention to function as intended, which will be apparent below.

Figure 3:
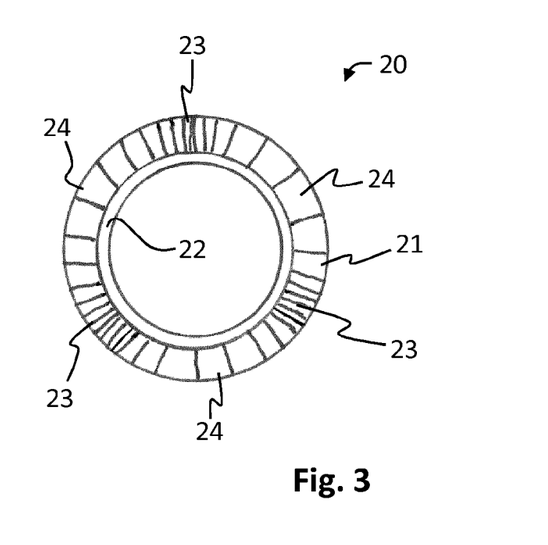
FIG. 3 shows a second thrust washer also included in the shown embodiment of the invention.

A second thrust washer 20, which is shown in FIG. 3, includes an undulated cam profile 21, and a chamfered edge 22 radially inside of the cam profile 21. In the shown embodiment the cam profile 21 includes three peaks 23 and three valleys 24 interspaced there between.

In the shown embodiment of the micro peck unit, the first and the second thrust washers 15 and 20 form important parts of the function of the unit.

The two thrust washers 15 and 20 will be arranged adjacent each other, such that the follower 17 of the first thrust washer 15 will bear against the ring-shaped cam profile 21 of the second thrust washer 20. The interaction between the cylindrical wheels 17 and the cam profile 21 will cause the thrust washers 15 and 20 to oscillate between a proximal position and a distal position with respect to each other as they rotate with respect to each other. In the proximal position the follower 17 of the first thrust washer 15 will be located opposite the valleys 24 of the second thrust washer 20, such that a gap between the thrust washers 15 and 20 is minimal. In the distal position the follower 17 of the first thrust washer 15 will be located opposite the peaks 23 of the second thrust washer 20, such that the gap between the thrust washers 15 and 20 is maximal.

The proximal and the distal positions are, in the shown embodiment, interspaced by 120°, such that the thrust washers 15 and 20 will oscillate to and from each other three times per mutual rotation. In the shown embodiment the follower 17 consists of three cylindrical wheels. The number of cylindrical wheels should be at least three, but may very well be 4, 5, 6 or more. The number of peaks 23 and valleys 24 should preferably correspond to the number of cylindrical wheels. Either, the number of peaks 23 and valleys 24 is equal to the number of cylindrical wheels, or it is a multiple thereof. The mutual oscillation of the thrust washers 15 and 20 will make sure that the drill spindle 13 will be advanced in a non-uniform manner. This will be explained below with reference to FIGS. 4-8, which are rotated 90° clock wise with respect to FIG. 1.

It is to be understood that the shown cylindrical wheels is a specific embodiment of a follower 17 arranged to follow the cam profile 21. The function achieved by the interaction of the cam profile 21 and the cylindrical wheels may however be achieved in other ways, specifically without the use of cylindrical wheels or other rolling elements. The oscillating movement is achieved in that the follower follows the cam profile 21. The use of cylindrical wheels or other rolling elements is advantageous since it reduces the friction and wear of the opposed surfaces. Other configurations, e.g. without rolling elements, are however conceivable and included in the scope of the invention.

Figure 4:
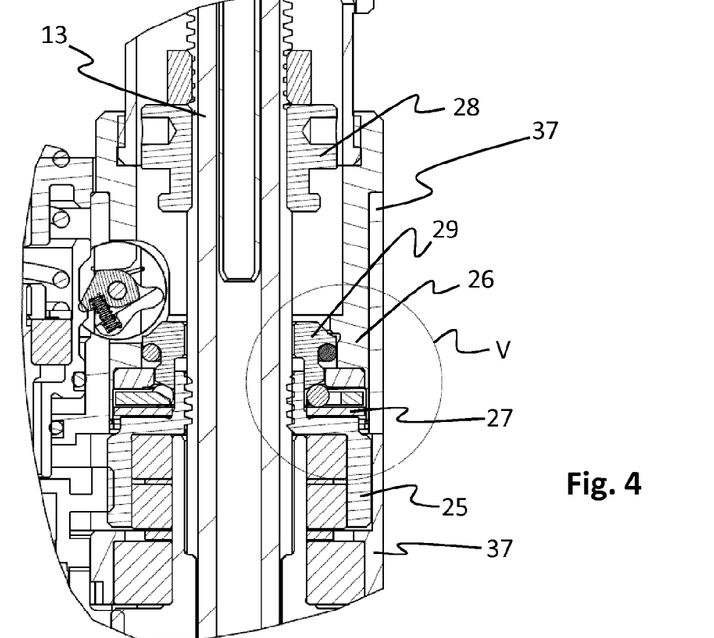
FIG. 4 shows a 90° rotated close up view of the encircled portion IV in FIG. 1, with a set of interposable rolling elements in an initial position.
Figure 5:
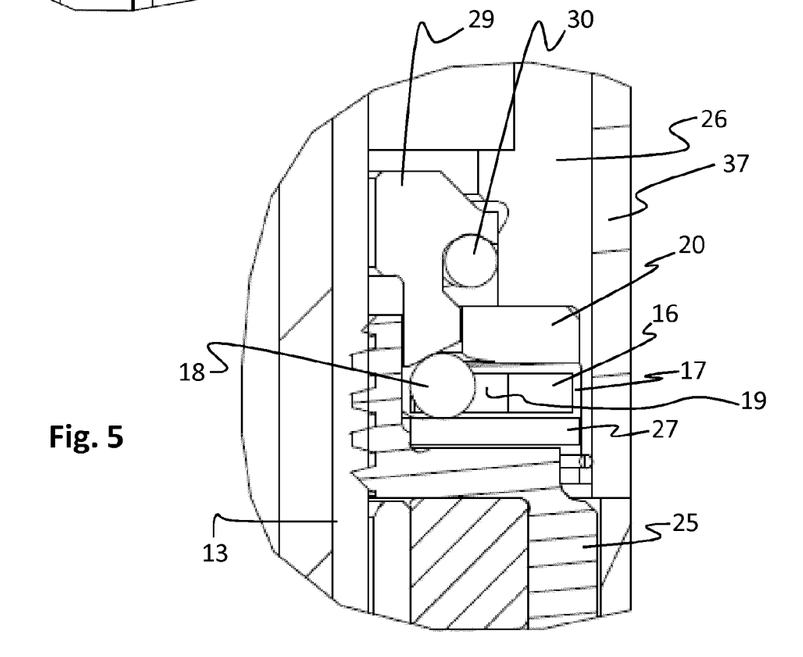
FIG. 5 shows a close up of the encircled portion V in FIG. 4.

In FIGS. 4 and 5, a portion of the spindle 13 is shown in a cross sectional view. The spindle is continuously rotated by means of a drive gear (not shown), which is drivingly connected to the motor 11. Further, the spindle is advanced and retracted by means of a feed gear 25. The feed gear is arranged co-axially outside the spindle 13 with a threaded engagement to the spindle 13. A stop ring 28 is arranged near a back end of the spindle 13. The stop ring 28 is arranged to mark the end of the drilling operation in that it constitutes a physical block that will stop the spindle 13 from further advancement. This is useful e.g. when it is important that the bore hole is of a specific depth, or when a countersinking is produced in the last stages of the drilling operation.

The oscillations between the thrust washers 15 and 20 will cause the spindle to be advanced in a non-uniform manner. This is due to that the feed gear 25 is axially supported by a tool housing 37 via the micro peck housing 26 and the two thrust washers 15 and 20, such that the mutual oscillations of the thrust washers 15 and 20 will cause the feed gear 25 to oscillate with respect to the tool housing 37. The micro peck housing 26 is, at least during operation of the drilling tool 10, intimately attached to the housing 37 of the drilling tool 10. For every turn the first thrust washer 15 rotates with respect to the second thrust washer 20 the feed gear 25 will oscillate back and forth three times. The oscillations will however appear in combination with that the spindle 13 is advanced. The effect of the oscillations and the corresponding non-uniform advancement of the spindle 13 is that the waste material that is machined away as the drill hole is produced will be cut off at even intervals, such that the waste material will be in the form of chips instead of long strips. This is important in order to minimize the risk of producing damages to the surface of the drill hole.

As is apparent in FIG. 5, an end washer 27 is located between the first thrust washer 15 and the feed gear 25. The end washer 27 is arranged to seal the micro peck unit that is encapsulated by the housing 26. Further, the end washer 27 is arranged to rotate along with the feed gear 25. The end washer 27 in a way functions as replaceable wear protection that minimizes the wear on the surface of the feed gear 25. The second thrust washer 20 is fixed with respect to the housing 26. In fact, the second thrust washer 20 may even be formed as an integral part of the housing 26.

The shown embodiment of the first thrust washer 15 will rotate at half the speed of the feed gear 25 and the end washer 27. This is due to that the follower 17 of the first thrust washer 15 consists of rotating cylindrical wheels that will be in contact with the inside surface 32 of the end washer 27 at one side and with the cam profile 21 of the static second thrust washer 20 at the opposite side.

In a further not shown embodiment both the first thrust washer 15 and the second thrust washer 20 may be formed without rolling elements. Instead, the oscillations may be achieved by two undulated interfaced surfaces that rotate with respect to each other. Rolling elements are however useful in order to minimise the friction between the interfaced surfaces. If no rolling elements were used, the first thrust washer 15 and its follower would preferably be arranged to rotate along with the feed gear 25.

The micro peck unit includes a de-activation mechanism that is arranged to de-activate the oscillating interaction between the thrust washers 15 and 20. The de-activation mechanism is arranged to support the feed gear 25 in a non-oscillating manner, such that the feeding of the spindle 13 will be uniform when the de-activation mechanism is triggered. The de-activation mechanism may be used e.g. when a countersinking is to be produced at the drill hole opening. Namely, when a countersinking is produced it is desired to have a uniform advancement of the spindle such that the surface of the countersinking will be as uniform, i.e. as even, as possible. The de-activation mechanism may however be triggered at any given point, i.e. whenever desired.

A countersinking is produced in the very last stage of a drilling operation, normally after the entire hole has been drilled. Therefore, in the shown embodiment, the de-activation mechanism will be triggered in the last stage of the drilling operation.

The de-activation mechanism includes a trigger wedge 29, which is arranged inside the housing 26 and which includes a number of balls 30 that are interspaced between the trigger wedge 29 and the housing 26. The trigger wedge 29 has a cylindrical body that is arranged co-axially outside the spindle 13. In the position shown in FIGS. 4 and 5 the trigger wedge 29 rests upon the interposable rolling elements 18 of the first thrust washer 15. In this position substantially no pressure is applied by the trigger wedge 29 upon the interposable rolling elements 18. In order to de-activate the micro peck function a pressure needs to be applied on the trigger wedge 29, which will be transmitted to the interposable rolling elements 18 and press them radially outwards.

Figures 6, 7, 8:
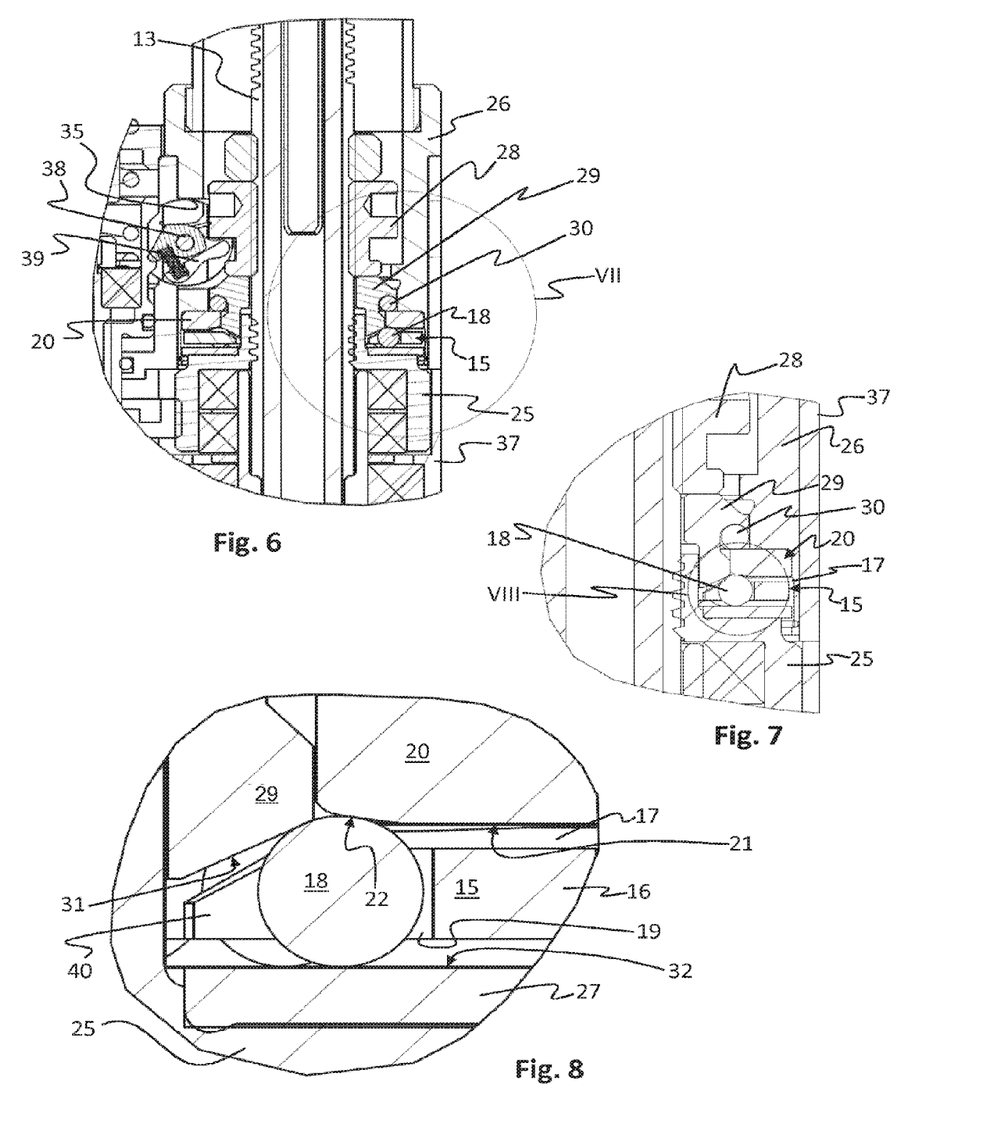
FIG. 6 shows the same view as shown in FIG. 4, but with the set of interposable rolling elements in an interfering position.
FIG. 7 shows a close up of the encircled portion VII in FIG. 6.
FIG. 8 shows a close up of the encircled portion VIII in FIG. 7.

In the final stage of the drilling operation, as shown in FIGS. 6-8, the spindle 13 has been advanced to such a point that the stop ring 28 has reached into contact with the trigger wedge 29 to push the trigger wedge 29 towards the first thrust washer 15. As a consequence, as the trigger wedge 29 is axially translated towards the first thrust washer 15, it will exert a force upon the interposable rolling elements 18 of the first thrust washer 15.

The trigger wedge 29 has a bevelled front edge 31 that is arranged to push the interposable rolling elements 18 of the first thrust washer 15 radially outwards when a force is applied. As the interposable rolling elements 18 are pushed radially outwards they will get into contact with the chamfered edge 22 of the second thrust washer 20. As the interposable rolling elements 18 are further pushed outwards in the radial direction, they will exert a pressure on the second thrust washer 20 that is sufficient to mechanically increase the gap between the thrust washers 15 and 20. As a consequence, the first and the second thrust washer 15 and 20 will be pushed away from each other. When the interposable rolling elements 18 are pushed all the way to the position shown in FIGS. 6-8, the gap between the thrust washers 15 and 20 will have increased such that the cylindrical wheels 17 will no longer be in contact with the ring-shaped cam profile 21 of the second thrust washer 20. Instead, the feed gear 25 will be axially supported by the housing 26 via the end washer 27, the interposable rolling elements 18, and the chamfered edge 22 of the second thrust washer 20. Hence, in this position the non-uniform interaction between the cylindrical wheels 17 and the cam profile 21 of the second thrust washer 20 is set out of play. In principle, the interposable rolling elements 18 are axially supported to a certain extent by the bevelled front edge 31 of the trigger wedge 29. The main part of the axial support is however provided by the chamfered edge 22 of the second thrust washer 20. The bevelled front edge 31 of the trigger wedge 29 is arranged to govern the radial position of the interposable rolling elements 18, and not to support them axially.

The final stage of the drilling operation will be performed with a uniform advancement of the spindle 13, such that the countersinking is formed in a uniform manner. Consequently, the countersinking will be formed with an even and uniform surface. The chamfered edge 22 of the second thrust washer 20 makes sure that the interposable rolling elements 18 are re-positioned radially inwards as soon as the pressure applied on the trigger wedge 29 is released. Namely, at this point the axial pressure from the feed gear 25 will, via the end washer 27, press the interposable rolling elements 18 towards the chamfered edge 22 of the second thrust washer 20. The chamfered edge 22 will force the interposable rolling elements 18 radially inwards, such that the trigger wedge 29 will be pushed away and such that the feed gear 25 will once again be axially supported by the housing 26 via the interaction between the undulated cam profile 21 and the follower 17.

In FIGS. 9 and 10, the micro peck unit 33 is shown as a separate unit, removed from the drilling tool 10. As is visible in FIG. 9, the micro peck unit 33 includes a housing 26, which is adapted to fit tightly inside the housing 37 of the drilling tool 10. Further, the unit 33 includes two flanges 34 for rigid attachment to the housing 37 of the drilling tool 10. The unit 33 also includes an opening 35. The opening 35 is arranged to provide access from outside the micro peck unit 33 to its inside. Specifically, as may be noted in FIG. 6, the opening 35 provides access for a lever 39 of a locking mechanism 38 to interact with the stop ring 28. The locking mechanism 38 and its interaction with the stop ring 28 is however not part of the invention and will not be described in detail in this application.

In FIG. 10, a sectional view of the micro peck unit 33 is shown, in which the interaction of the different components of the unit may be observed. Specifically, it may be noted that the housing 26 comprises a thin end portion 26a at the end of the micro peck unit 33 that faces the feed gear 25. The thin end portion 26a provides a wide access opening inside which the feed gear 25 may be housed when the micro peck unit 33 is inserted into the drilling tool 10.

The inside of the housing 26 includes a number of shoulders. A first shoulder 42 is arranged to make sure that the trigger wedge 29 will not slide out of position backwards. A second shoulder 43 is arranged to axially support the second thrust washer 20. Further, a circular track 44 is provided inside the thin end portion 26a and close to the opening of the housing 26. A blocking ring 36 is arranged inside said circular track 44 in order to keep the parts of the unit from falling out of the unit 33 once it has been removed from the drilling tool. During operation of the drilling tool, the micro peck unit 33 is locked to the housing 37 of the drilling tool by the flanges 34. At the opposite end of the micro peck unit 33 the feed gear 25 extends into the unit 33 and compresses all the parts of the unit, such that the blocking ring 36 has no function when the micro peck unit 33 is located inside the housing 37 of the drilling tool 10.

In FIG. 10 it is further apparent that the second thrust washer 20 has an undulated surface. On the right side the view of the second thrust washer 20 has been cut through a valley 24, and on the left side it has been cut through a peak 23 of the cam profile 21. Further, at the left side, it is apparent that the view of the main body 16 of the first thrust washer 15 has been cut through one of the followers 17. The follower 17 is at this point in contact with a peak 23 of the undulated surface of the second thrust washer 20 and with the end washer 27 at the opposite side. It is also illustrated in FIG. 10 how the interposable rolling elements 18 are positioned in the tracks formed between the solid parts 40 and 41.

Above, the invention has been described with reference to one specific embodiment. The invention is however not limited to this embodiment. It is obvious to a person skilled in the art that other embodiments are possible without departing from the scope of the invention, which is defined by the following claims.

The invention claimed is:
1. A drilling tool comprising:
a spindle,
a housing that at least partly houses said spindle,
a motor for driving said spindle, and
a feed gear that is drivingly connected to the motor and threaded around the spindle so as to feed the spindle axially with respect to the housing by means of mutual rotation between the feed gear and the spindle in a drilling operation,
wherein the drilling tool further comprises a micro peck unit that comprises:

at least one undulated cam profile and at least one follower arranged to bear against said at least one cam profile, which, in operation, is arranged as an axial support between the feed gear and the housing, wherein one of the cam profile and the follower is fixedly arranged with respect to the housing and the other is arranged to rotate along with the feed gear or by interaction with the feed gear, such that said micro peck unit produces an oscillating movement of the feed gear and the spindle upon rotation of the feed gear in a drilling operation, and a de-activation mechanism including first and second opposed circular contact surfaces and a set of interposable rolling elements, wherein the first circular contact surface is axially supported by the housing in operation, wherein the second circular contact surface is axially supported by the feed gear in operation, wherein a gap is provided between the opposed circular contact surfaces into which the set of interposable rolling elements are arranged to be at least partially re-positioned in order to separate the first circular contact surface and the second circular contact surface from each other, so as to simultaneously axially displace the feed gear with respect to the housing, such that the at least one follower of the micro peck unit will not bear against the at least one cam profile and such that no oscillating movement will be produced by the micro peck unit when the interposable rolling elements are positioned at least partially inside the gap between the contact surfaces, and wherein the de-activation mechanism is triggered by an axial position of the spindle, such that the interaction of the at least one undulated cam profile and the at least one follower is interrupted when the spindle reaches a specific axial position, wherein the drilling tool further comprises:

a trigger wedge arranged to control the position of the interposable rolling elements, wherein the trigger wedge is controllable to reposition the interposable rolling elements from an initial position, in which the feed gear is axially supported by the at least one undulated cam profile and the at least one follower, to an interfering position in which the feed gear is axially supported by the interposable rolling elements that bear against the contact surfaces, and wherein the interposable rolling elements comprise balls that are arranged in radial tracks in a first thrust washer that is located axially between the contact surfaces.

2. The drilling tool according to claim 1, wherein the trigger wedge is cylindrical and located co-axially outside the spindle and includes a bevelled front edge that, when the trigger wedge is axially translated towards the interposable rolling elements, is arranged to push the interposable rolling elements in a first radial direction along the radial tracks of the first thrust washer into the interfering position between the circular contact surfaces.

3. The drilling tool according to claim 2, wherein the first circular contact surface is chamfered, so as to push the set of interposable rolling elements in a second radial direction, opposed to the first radial direction, out of the gap between the opposed circular contact surfaces when the trigger wedge is translated away from the interposable rolling elements.

4. The drilling tool according to claim 2, wherein the trigger wedge, in operation, cooperates with a stop ring that is arranged on the spindle, the trigger wedge having a back end that is arranged as an abutment for the stop ring, such that the trigger wedge is triggered as a function of the axial position of the spindle.

5. The drilling tool according to claim 1, wherein the at least one follower includes a set of primary rolling elements arranged in the first thrust washer to bear against the at least one undulated cam profile at one side, and against a surface connected to the feed gear at the opposite side.

6. The drilling tool according to claim 1, wherein the micro peck unit comprises a second thrust washer that includes, both, the at least one undulated cam profile and the first circular contact surface, and wherein the at least one undulated cam profile and the first circular contact surface are radially spaced from each other on said second thrust washer.

7. The drilling tool according to claim 1, wherein the micro peck unit comprises an end washer that incorporates the second circular contact surface, and that bears against the feed gear in operation.

8. The drilling tool according to claim 7, wherein the micro peck unit is a separate unit comprising a separate housing and the end washer, and is configured to be fixedly arranged with respect to the housing of the drilling tool co-axially outside the spindle of the drilling tool.

9. The drilling tool according to claim 1, wherein the drilling tool further comprises tool implements both for drilling a hole and for producing a countersinking, and wherein a stop ring is located at a specific position along the spindle such that the interposable rolling elements are pushed into an interfering position when a countersinking operation is performed.

* * * * *